June 5, 1934.     W. BARBER     1,961,731
TOP FOR RUMBLE SEATS
Filed Aug. 28, 1928
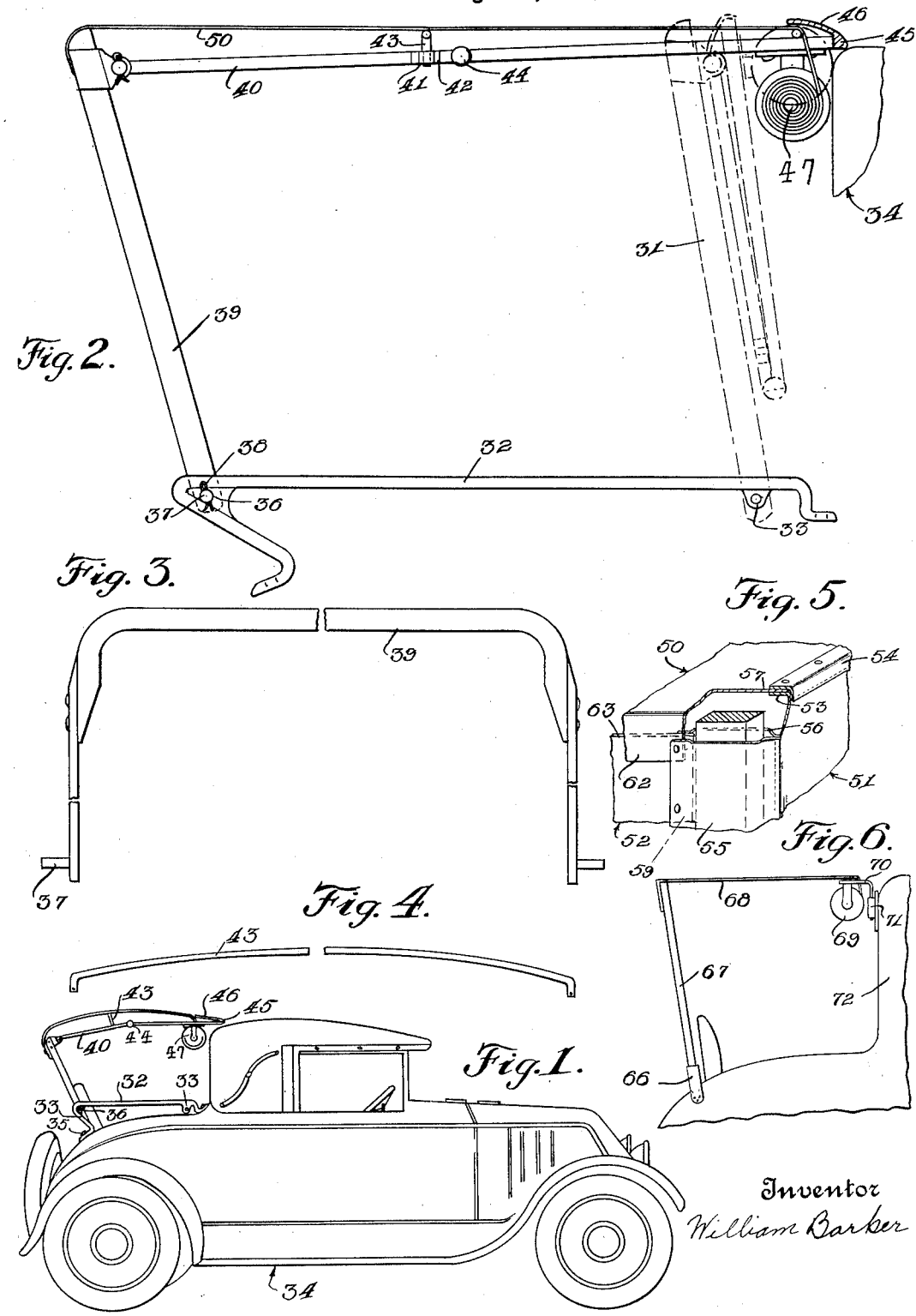

Patented June 5, 1934

1,961,731

UNITED STATES PATENT OFFICE 1,961,731

TOP FOR RUMBLE SEATS

William Barber, Brooklyn, N. Y.

Application August 28, 1928, Serial No. 302,515

3 Claims. (Cl. 296—99)

This invention relates to an auxiliary top for automobiles equipped with rumble seats.

The object of this invention is to provide a top which can readily be attached and detached.

Another object of this invention is to provide an auxiliary top which can be folded-up to the rear of the main top without obstructing the rear vision.

A still further object of this invention is to provide a top structure wherein the roof can be rolled up automatically.

In the accompanying drawing which shows an operative embodiment of my invention

Figure 1 is a side elevation of a car showing my auxiliary top in place.

Figure 2 is a larger detailed view of the parts thereof in open and folded positions.

Figure 3 is an elevational view of the rear stay.

Figure 4 is an elevational view of the center bow.

Figure 5 is a perspective view of a portion of a corner showing the interlocking of the weatherproof curtain joints.

Figure 6 shows a modified form of my rumble-seat top.

The seat top shown, comprises essentially a railing 32 secured to car 34 by bolts 35, and which is provided with apertures 36 through which extend pivot studs 37, each of which studs are provided with a transverse bore through which is placed cotter-pins 38. It is, of course, obvious that the railing 32 when not otherwise in use may be employed to secure baggage or luggage atop the folded-in rumble seat. At the forward end of railing 32 is an apertured ear 33 for holding the top in folded position as indicated at 31. The stud 37 carries a rear stay 39 which has a transverse portion 39'. Pivotally secured to stay 39 is a folding strut 40, having at point 41 intermediate the ends thereof a socket 42 into which is plugged the end portion of the center bow 43. A folding strut is provided substantially at its center with a stump joint 44 and at its forward end with a front bow 45. The front bow 45 is provided with a rearwardly extending portion 46 shielding the roller 47 and connecting with the end of the top member 50.

In Figure 5 is shown the conjunction of the edges of top member 50, side curtain 51, and rear curtain 52. To the upper edge 53 of curtain 51 is sewn, or otherwise secured, the strip 54 and to the rear edge of said curtain 51 is similarly attached strips 55 and 56. Into the bifurcation formed by edge 53 and strip 54 there is placed and fastened the edge 57, of member 50. The strips 55 and 56 fork around stay 39, and enclose edge 59 of curtain 52. The rear edge 62 of curtain 50 overlaps top edge 63 of curtain 52 and is secured in position by means of fasteners designed to be operated from the inside of car.

In Figure 6, I have shown a modified form of a rumble seat top made up of but few parts and which may be easily put into place or removed without the aid of tools. This embodiment consists chiefly in a socket member 66, secured to the body of a car, a rear stay 67, inserted in the socket, to which is attached the rear end of top member 68 the forward end of which is secured to roller 69 and said top member being adapted to be wound around said roller when not in use. The roller 69 is held in position by bracket 70, said bracket being held by socket 71 secured to rear of automobile top 72.

In operation, the back stay is put in place on the anchor rail, the folding strut rod is extended to the car top, the top cover is then unwound from the roller and fastened to the transverse section of the rear stay, which completes the setting up of the auxiliary top. The side and back curtains are then placed in position when desired in the ordinary way. When the rumble seat is closed and there is no need for the auxiliary top all that is necessary is to remove cotter pins from the pivot studs, unloosen the top cover from the rear stay, which cover then is automatically wound up on the roller, bend down the strut rod, shove the back-stay up against the back of the car, place the pivot studs in the apertured ears at the forward end of the rail, and insert cotter pins completing the operation. Should it be desired to remove the top altogether, it may be folded and placed in the rear of the car under the seat.

Having thus described my invention, what I claim as new and wish to protect by Letters Patent, is:

1. In combination with an automobile having a top, a body and a rumble seat adapted to be encased in said body, of a plurality of anchor rail members mounted on said body adjacent said rumble seat, ears carried by said rail members at each end thereof, a plurality of foldable stay members, means for securing said foldable stay members to said rail members at the forward ears when in folded condition and to the rear ears when in unfolded condition, and means carried by said stay members for sheltering said rumble seat.

2. In combination with an automobile having a top, a body and a rumble seat adapted to be encased in said body, of a plurality of anchor rail members mounted on said body adjacent said rumble seat, ears carried by said rail members, a plurality of foldable longitudinal and bow-shaped transverse stay members adapted to collapse, means for securing said stay members to one end of said anchor rail members at the ears thereof when not in collapsed condition and to the other end of said anchor rail members when in collapsed condition, and means carried by said stay members for sheltering said rumble seat.

3. In combination with an automobile having a top, a body and a rumble seat adapted to be encased in said body, of a plurality of anchor rail members mounted on said body adjacent said rumble seat, ears carried by said rail members, a plurality of foldable longitudinal and bow-shaped transverse stay members adapted to collapse, means for securing said stay members to one end of said anchor rail members at the ears thereof when not in collapsed condition and to the other end of said anchor rail members when in collapsed condition, and means carried by said stay members for sheltering said rumble seat, including a cover and a cover roller mounted at the end of said stay members when not in collapsed condition to tension said cover.

WILLIAM BARBER.